United States Patent [19]

Tamada et al.

[11] Patent Number: 5,150,974
[45] Date of Patent: Sep. 29, 1992

[54] GREASE-SEALED BEARING WITH OXIDE LAYERS

[75] Inventors: Kenji Tamada, Kuwana; Hirokazu Nakajima, Kaizu; Akio Okayama; Takahiro Mizutani, both of Kuwana, all of Japan

[73] Assignee: NTN Corporation, Osaka, Japan

[21] Appl. No.: 576,498

[22] PCT Filed: Jan. 12, 1990

[86] PCT No.: PCT/JP90/00031
§ 371 Date: Sep. 10, 1990
§ 102(e) Date: Sep. 10, 1990

[87] PCT Pub. No.: WO90/08264
PCT Pub. Date: Jul. 26, 1990

[30] Foreign Application Priority Data

Jan. 14, 1989 [JP] Japan .................................. 1-6557

[51] Int. Cl.$^5$ .................... F16C 33/10; F16C 33/62
[52] U.S. Cl. .................................. 384/463; 384/492; 384/625
[58] Field of Search .............. 384/492, 462, 625, 456, 384/463, 464, 513, 516, 565, 569, 477, 484, 486, 627, 907, 912, 913

[56] References Cited

U.S. PATENT DOCUMENTS

| | | | |
|---|---|---|---|
| 1,661,448 | 3/1928 | Taylor | 384/625 |
| 3,198,735 | 8/1965 | Lamson et al. | 384/463 |
| 3,843,962 | 10/1974 | Bogue | 384/463 |
| 4,871,266 | 10/1989 | Oda | 384/492 |

FOREIGN PATENT DOCUMENTS

| | | | |
|---|---|---|---|
| 3426279 | 1/1986 | Fed. Rep. of Germany | 384/492 |
| 174718 | 10/1983 | Japan | 384/492 |
| 125824 | 5/1988 | Japan | 384/463 |
| 1210618 | 8/1989 | Japan | 384/492 |

Primary Examiner—Thomas R. Hannon
Attorney, Agent, or Firm—Nikaido, Marmelstein, Murray & Oram

[57] ABSTRACT

The grease-sealed bearing is formed on rolling surfaces (4) of rings (2, 2) of the bearing (1) with oxide layers (5) having a thickness of 0.1–2.5 microns, the development of peculiar peeling on the rolling surfaces of the bearing can be prevented. If it is used as a bearing for an alternator or the like, its duration can be increased.

2 Claims, 2 Drawing Sheets

GREASE-SEALED BEARING WITH OXIDE LAYERS

TECHNICAL BACKGROUND

This invention relates to a grease-sealed bearing having grease sealed therein and particularly to one prevented from peculiar peeling which appears especially on the rolling surface of the bearing.

BACKGROUND ART

In recent years, as automobiles are getting more compact in size, lighter in weight and higher in efficiency, their electrical parts and accessories are required not only to be small in size and light in weight but also to have high performance and high power. In order to meet these requirements, with an alternator or a solenoid clutch for a compressor as shown in FIG. 4, it is necessary to compensate for a decrease in power owing to a reduction in size by increasing its rotating speed. In order to increase the speed, its pulley has to be as small as possible. Further, in order to prevent a reduction in the transmission efficiency, it is necessary to form the pulley 6 with a plurality of grooves 7 for receiving power transmission belts as shown in FIG. 4 and to keep the tension of the belts high. As a result, high-speed rotation and high load act on a bearing 1 supporting the pulley 6.

Such high-speed rotation and high load can cause peeling on the rolling surface of the bearing. Unlike an ordinary peeling occurring on the rolling surface or in its superficial area owing to metal fatigue, this type of peeling indicates a peculiar destructive phenomenon which has started from a deep area in the bearing. Owing to this peculiar peeling, the actual life of the bearing becomes shorter than its calculated life expectancy.

Generally speaking, with a grease-sealed bearing, the life of the grease is shorter than the rolling life of the bearing itself and thus the life of the bearing is determined by the life of the grease.

But, a decrease in the lubricity of the grease is not the only cause of the occurrence of the above-described peculiar peeling. Namely, from the fact that no influence of heat release such as coloring is seen on the rolling surface of the bearing even if the peculiar peeling appears thereon, it is apparent that the peeling is not caused by the metal-to-metal contact resulting from a decrease in lubricity. Also, the life resulting from the peculiar peeling is shorter than the durability resulting from the life of the grease.

Such peculiar peeling can be prevented by relaxing the conditions of use; e.g., by increasing the size and thus the load capacity of the bearing or by lowering the tension of the belts. However, increasing the size of the bearing leads to an increase in the size of the related parts. This will increase the cost and make it difficult to reduce the size of the machine and to improve the transmission efficiency.

In view of the aforementioned problems of the prior art, an object of the present invention is to provide a grease-sealed bearing which is free of the peculiar peelng and has a stable durability under the conditions of high-speed and high load.

SUMMARY OF THE INVENTION

The present invention encompasses a grease-sealed bearing 1, shown in FIG. 1, with an oxide coating 5 having a thickness of 0.1 to 2.5 microns on the rolling surfaces 4 of the rings.

With the bearing according to the present invention, the peculiar peeling which appears on the rolling surface can be prevented, and accordingly breakage owing to the peculiar peeling is also prevented. Thus the expected life of the bearing is assured. If the bearing according to this invention is used as a bearing in an alternator or the like which works under high-speed rotation and high load, its life will be less variable and stable bearing properties will be assured.

BEST MODE FOR EMBODYING THE INVENTION

In order to describe the present invention in more detail, it will be described with reference to the accompanying drawings.

Figure 2:
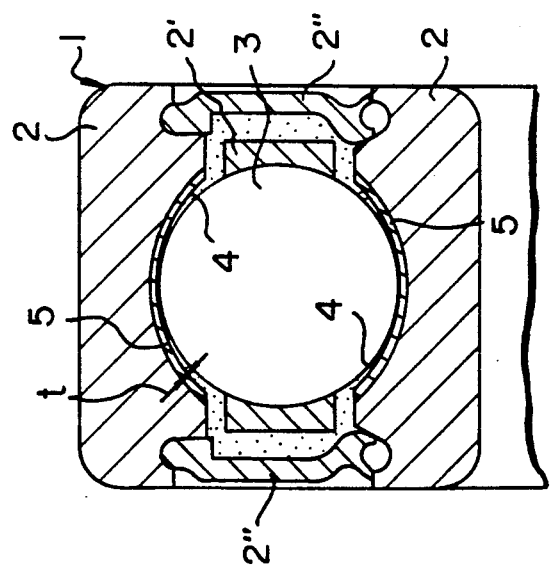
FIG. 2 is a view schematically showing the internal structure of the rolling surface which has suffered the peculiar peeling.
Figure 4:
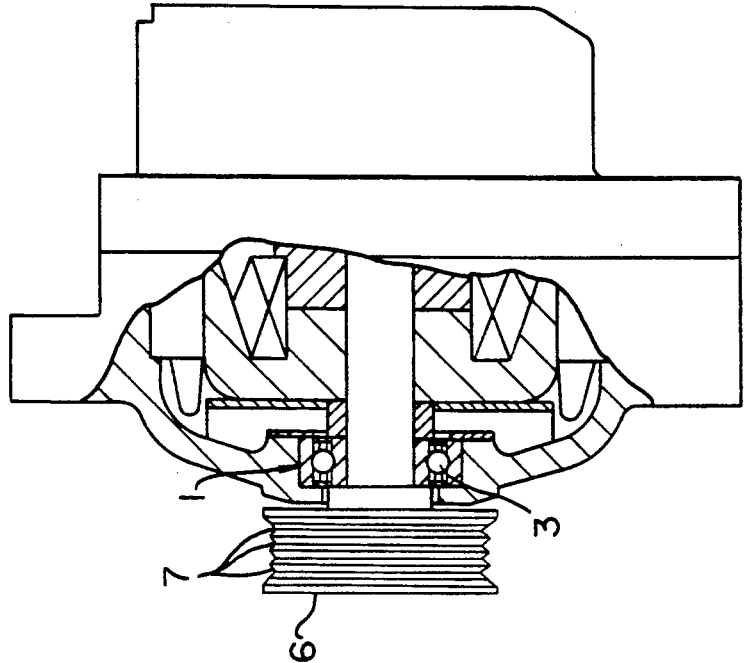
FIG. 4 is a view showing a pulley and a bearing of an alternator.

The present inventors observed a rolling surface which has developed the peculiar peeling and studied cracks which cause the peeling. As a result, it was found, as shown schematically in FIG. 2, that cracks 8 which cause peeling are small near the rolling surface but in the deeper area below the rolling surface, a large number of long cracks extend in the direction of depth.

The manner of development of such cracks totally differs from that in an ordinary peeling resulting from metal fatigue. Namely, with an ordinary peeling, cracks which have developed near the rolling surface spread in parallel with the rolling surface. Then they extend toward the rolling surface, causing breakage. With the peculiar peeling, cracks develop in a certain depth below the rolling surface and grow in the direction of depth.

Figure 3:
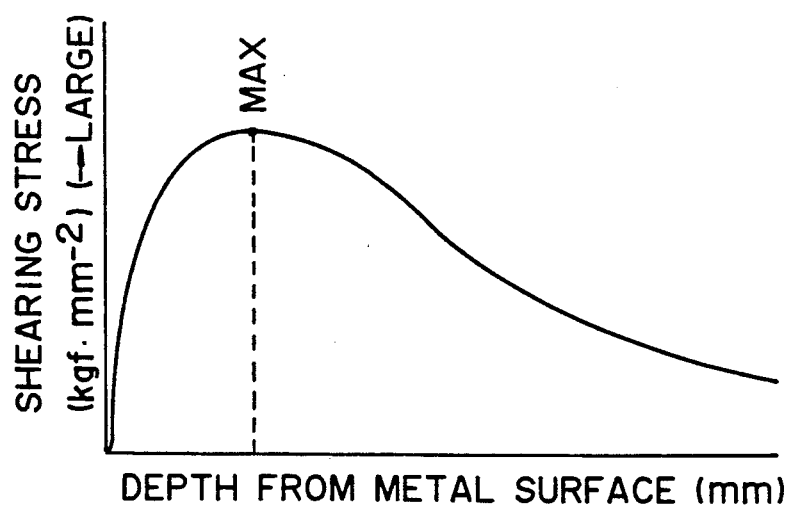
FIG. 3 is a graph showing the distribution of the shearing stress which develops under the metal surface as a result of rolling contact between metals.

The range where the cracks leading to an ordinary peeling develop coincides with the distribution of the shearing stress generated below the metal surfaces when they are brought into rolling contact with each other. Namely, the shearing stress generated below the metal surfaces in such a case has its maximum value in an area not so deep below the surfaces, as shown in FIG. 3. The range where the maximum shearing stress is generated does not coincide with the range where the cracks leading to the peculiar peeling develop.

From the above discussion, it is believed that the peculiar peeling is caused not by cracks resulting from insufficient lubrication or metal fatigue but by cracks owing to a change in the metal structure by the action of foreign substances which have invaded into the metal.

With general machine parts, it is known that if hydrogen infiltrates into a metal, particularly steel, hydrogen embrittlement occurs.

With bearings, however, since the stress generated on the contact surface between the rolling elements and the rolling surface is not a static stress such as in delayed destruction caused by hydrogen embrittlement but a fluctuating stress, hydrogen embrittlement has heretofore posed no problems. With an oil-lubricated bearing, which is used in harsh environments, it is believed that the catalytic action on its metal surface disappears owing to stains on the rolling surface at the initial stage of use.

But with a grease-sealed bearing, whose rolling surface is less liable to be stained as far as it is used in normal conditions, it is highly probable that if the rolling surface is put locally under high-temperature and high-pressure conditions owing to high-speed rotation of the rolling elements, the metallic rolling surface may perform catalytic action. This will cause the chemical decomposition of grease, and thus the production of hydrogen.

If there is a fear of the peculiar peeling owing to hydrogen embrittlement, this can be prevented by not rotating the bearing at a high speed. But if not rotated at a high speed, it will become impossible to obtain high-performance, high-power, compactness and lighter weight of the bearing as discussed in the Background Art section.

Figure 1:
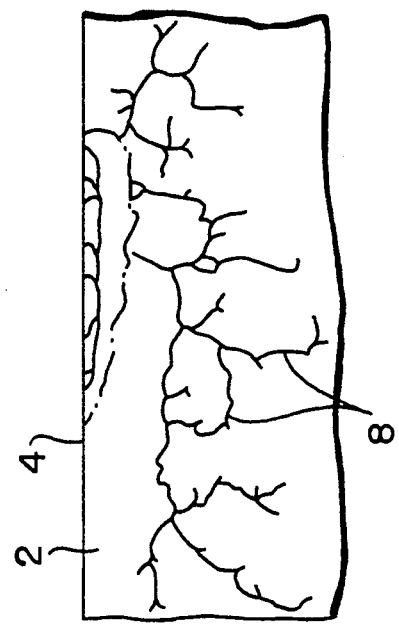
FIG. 1 is a partially cutaway perspective view showing the structure of this invention.

Based on the above estimates, the present inventors have prepared, as shown in FIG. 1, a bearing 1 comprising rings 2, rolling elements 3 arranged between the rings 2, a cage 2' for guiding the rolling elements 3, and seal members 2" provided at both sides of the rings 2. They are formed on its rolling surfaces 4 with oxide layers 5. This bearing was put to a life test to verify the assumption that by inactivating the rolling surfaces 4 by covering them with chemically stable oxide layers 5, it will be possible to eliminate the catalytic action and thus to prevent the production of hydrogen owing to the decomposition of grease.

In this test, bearings adapted to be used at the pulley side of an alternator were used. After forming oxide layers having various thicknesses on the rolling surfaces on their rings, they were mounted on an alternator and put to the life test. The roughness of the rolling surfaces of each sample covered with oxide layers was measured to see if there is any correlation with the life. The oxide layers 5 were formed by blackening treatment. The rings were immersed in a caustic soda solution heated at low temperature (130° C.–160° C.) to form iron oxide layers on the rolling surfaces. The thickness t of each oxide layer 5 is based on the relation between the time taken for the blackening treatment of each test metallic piece and the thickness of the layer formed during that time.

The life test was conducted for 1000 hours. The results are shown in Table 1.

◯ indicates that no peeling was observed after 1000 hours have passed while X indicates that peeling appeared before 1000 hours have passed.

TABLE 1

| Sample No. | Treated Time | Thickness of oxide layer (micron) | Surface roughness Rmax (micron) | Judgement |
|---|---|---|---|---|
| 1 | 5 sec | less than 0.1 | 0.68 | X |
| 2 | 10 sec | 0.1 | 0.68 | ◯ |
| 3 | 30 sec | 0.7 | 0.69 | ◯ |
| 4 | 1 min | 1 | 0.71 | ◯ |
| 5 | 5 min | 1.5 | 0.78 | ◯ |
| 6 | 10 min | 1.7 | 0.86 | ◯ |
| 7 | 15 min | 2 | 0.91 | ◯ |
| 8 | 20 min | 2.5 | 1.06 | ◯ |
| 9 | 25 min | 3 | 1.52 | X Ordinary peeling |

The results shown in Table 1 reveal that no peculiar peeling appears if the oxide layers have a thickness t within the range of 0.1–2.5 microns (sample Nos. 2 to 8) and that all the samples had a life of 1000 hours or more.

In contrast, with the sample No. 1, peculiar peeling developed on its rolling surfaces in a short time. Because the treatment time was short, no coloring owing to blackenings was observed on its rolling surfaces and the layers had a thickness of less than 0.1 micron.

From these results, it is apparent that there is a strong correlation between the oxide layers 5 and the development of peculiar peeling. Also it will be recognized that if the oxide layers have a thickness t of at least 0.1 micron, the peculiar peeling can be prevented. The results proved the assumption that the oxide layers serve to suppress the catalytic action on the rolling surfaces and thus to restrain the production of hydrogen and the development of cracks owing to hydrogen embrittlement.

On the other hand, with the sample No. 9 treated for 25 minutes and with oxide layers having a thickness t of 3 microns, its life has expired at the lapse of 210 hours owing to the peeling which developed on the rolling surfaces. The peeling in this case was not the peculiar peeling but an ordinary peeling which developed near the surface layer.

The peeling on the rolling surfaces of the sample No. 9 has presumably something to do with the surface roughness value thereof shown in Table 1. Namely, as shown in Table 1, the larger the thickness t of the oxide layers, the more the surface roughness of the rolling surfaces 4 worsens. The worsening of the surface roughness is believed to increase the metallic contact between the rolling elements 3 and the rolling surfaces and thus cause peeling.

In order to examine the influence of such surface roughness, we checked how the rate of occurrence of the peeling on the rolling elements changes with change in the surface roughness of the rolling surfaces. Table 2 shows the results.

TABLE 2

| Test No. | Surface roughness of rolling surface Rmax (micron) | Peeling occurrence rate D (%) of rolling element |
|---|---|---|
| 1 | 0.2 | 0 |
| 2 | 1.0 | 10 |
| 3 | 2.1 | 40 |
| 4 | 3.0 | 100 |
| 5 | 5.0 | 100 |
| 6 | 15.0 | 100 |

Each peeling occurrence rate D (%) on the rolling elements represents the ratio of the number of specimens which showed peeling after the life test for a predetermined time to the number of all the specimens.

The results shown in Table 2 indicate that if the surface roughness value Rmax changes from 1.0 to 2.1 microns, the peeling occurrence rate D changes from 10% to 40%. From this fact, we can estimate that as with the sample Nos. 8 and 9 shown in Table 1, if the surface roughness changes from 1.06 microns to 1.52 microns, the peeling occurrence rate D will change from 10% to 30%.

Next, we shall calculate the oil film parameter $\Lambda$. If the rolling elements are steel balls, because their surface roughness is extremely small, the ratio of the parameter $\Lambda$ is presumably equal to that of the surface roughness of the rolling surfaces. Thus if the life test is conducted under such conditions that the parameter $\Lambda$ will be 1-2 (metallic contact occurs), there is a possibility that the ratio of the life of the sample No. 8 to that of the sample No. 9 will be about four times. The results shown in Table 1 support these facts.

From, the above discussion, in order to improve the durability of a bearing, it is necessary that the oxide layers have a thickness t large enough to show inactivating effects but small enough not to cause the shortening of life owing to the worsening of the roughness value. According to the present invention, the thickness t of the oxide layers should be set to the range of between 0.1 and 2.5 microns.

The oxide layers 5 may be formed by a blackening treatment as described above. Also they may be formed by heating in a suitable medium. For example, the bearing may be heated at 200° C. or less in the atmosphere with grease sealed inside the rolling surfaces. Further, they may be formed by corroding the rolling surfaces in an oxide solution such as alcohol nitrate, hydrochloric acid and sulphuric acid to such an extent as to be colored.

We claim:

1. A grease-sealed bearing having inner and outer rings that enclose a plurality of rolling elements, a cage for guiding the plurality of rolling elements, seal members for sealing said plurality of rolling elements enclosed between said inner and outer rings, and grease sealed therebetween, characterized in that oxide coatings having a thickness of 0.1-2.5 microns are formed on rolling surfaces of the rings.

2. A grease-sealed bearing comprising:
   a plurality of rolling elements;
   inner and outer rings positioned with each other so as to enclose said plurality of rolling elements, said inner and outer rings each having outer and inner rolling surfaces, respectively, for operatively contacting said plurality of rolling elements, the rolling surfaces being formed with oxide coatings of 0.1-2.5 microns thickness;
   a cage located between said inner and outer rings so as to guide said plurality of rolling elements;
   seal members for sealing said plurality of rolling members enclosed between said inner and outer rings; and
   grease filled between said inner and outer rings, said plurality of rolling elements and said seal members.

* * * * *